Figure 1:
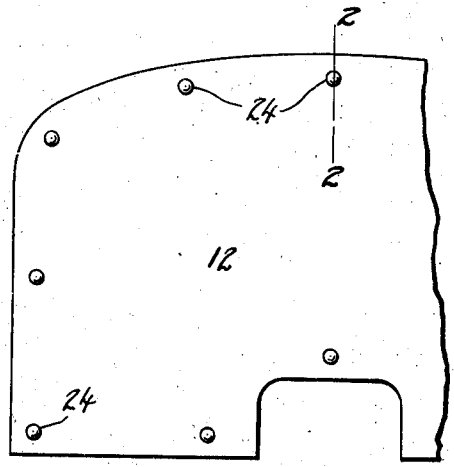

Sept. 6, 1938.  M. S. RANDALL  2,129,308
LAMINATED PANEL
Filed Oct. 14, 1935

INVENTOR.
Meredith S. Randall
BY Parker & Burton
ATTORNEYS.

Patented Sept. 6, 1938

2,129,308

UNITED STATES PATENT OFFICE 2,129,308

LAMINATED PANEL

Meredith S. Randall, Detroit, Mich., assignor to Woodall Industries Incorporated, Detroit, Mich., a corporation of Michigan Application October 14, 1935, Serial No. 44,919

2 Claims. (Cl. 154—44)

My invention relates to improvements in laminated panel-like structures and to improvements in the method of their fabrication and securement in position. It particularly relates to improvements in laminated insulation panels wherein a loose, fragile, compressible cellular lamination is embodied and to an improved method of fabricating such a laminated structure and mounting the same upon a support. Specifically, it is shown as embodied in an insulated dash panel such as are used in automobiles.

An object is to provide improvements in laminated panel-like structures whereby the several laminations which make up the panel may be quickly assembled and securely held together, and the laminated panel may be quickly, easily, and securely attached to a suitable support intended to receive the same.

A meritorious characteristic of my improved panel consists in the embodiment in a panel, which includes a fluffy, downy, compressible interior layer which possesses a high insulation factor and outer layers between which such interior layer is arranged, of improved means adapted to prevent injurious compression of the interior layer and adapted to cooperate in the securement of the several layers together and the securement of the complete panel to a supporting structure.

An important feature comprises the provision of spacers arranged within the interior layer between the two outer protective layers to take the thrust or impact brought to bear upon either of said outer layers to prevent injurious compression of the inner insulating layer. These spacers are shown as formed of compressible insulating material and as cooperating with securing means which holds the several layers together. In the attachment of the structure to a support these spacers cooperate with securing means to accomplish such end. In the fabrication of the complete laminated structure these spacers and securing means facilitate the assembly of the several laminations together serving after the manner of a jig in the make up of the complete unit.

In a preferred embodiment of the invention, spring fasteners cooperate with the spacers to retain the several laminations in assembled relationship without the employment of adhesive or other connecting means and to maintain the proper thickness of the laminated panel against destructive compression. These fasteners are further adapted to attach the laminated assembly to a suitable support upon slight additional compression of the assembly. These fasteners further cooperate with the relatively compressible spacer elements to provide one lamination of the unit with means to facilitate the assembly of the other laminations thereupon.

The construction embodies three laminations. There are two outer protective laminations, which preferably are moisture resistant, and an interior compressible lamination of loosely integrated insulation material, which preferably is also moisture resistant. The moisture resistant characteristic is preferably due to the presence of moisture resistant thermoplastic material. The presence of the spacers prevents permanent compacting of the laminated structure due to adhesion of the thermoplastic material upon compression of the structure.

Figure 2:
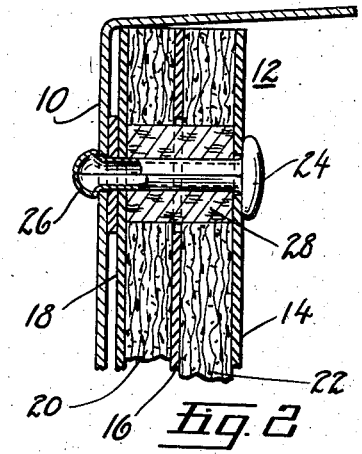
Figure 3:
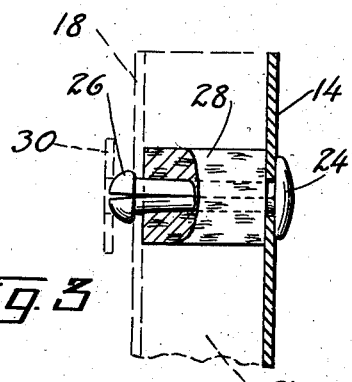
Figure 4:
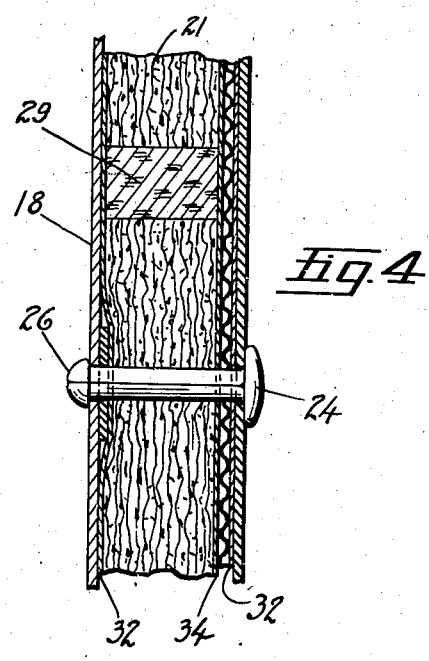
Figure 5:
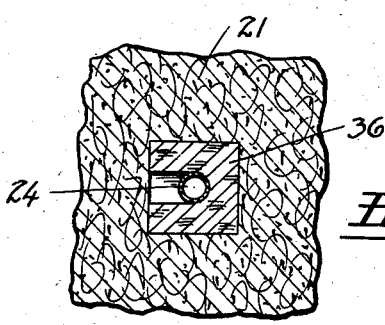

Other objects, advantages, and meritorious features of my improved construction will more fully appear from the following description, appended claims, and accompanying drawing, wherein:

Figure 1 is a front elevation, partly broken away, of my improved panel embodied in an automobile dash, Fig. 2 is a cross-sectional view taken on the line 2—2 of Fig. 1, Fig. 3 illustrates a sectional view through one embodiment of my invention, Fig. 4 illustrates a modified embodiment of my invention, and Fig. 5 illustrates a modified form of spacer element.

While I have illustrated my invention as embodied in an insulation panel of the type employed in an automobile dash structure, it is obviously suitable for use in other constructions. In an automobile there is a metal panel which separates the passenger carrying compartment of the automobile body from the engine compartment and the insulating dash panel is secured to the passenger compartment side of this metal sheet. I have shown my improved panel as so secured.

In the drawing the metal sheet is indicated as 10 and my improved panel is indicated in assembly as 12. It comprises what might be termed a foundation layer or lamination 14. This is formed of some material suitable for the interior trim of an automobile body at such point and a material which I have found suitable to employ is a composition fiber board which possesses thermoplastic characteristics. A suitable embodiment is a board known commercially as "K B" board which is made up of cellulose fibers held together by an asphalt composition binder. This material is relatively dense, tough, and moisture resistant and it may be decoratively embossed or otherwise deformed and will permanently retain its deformed shape.

In order that the dash panel prior to its assembly upon the car may comprise a unit which can be handled for storage or shipment there is provided on the opposite side another protective lamination indicated as at 18 which may also be formed of K B board or other suitable material such as asphalt saturated paper felt. Between these two laminations is arranged the insulation layer which is formed of loosely integrated cellular insulation material. This material is very porous and open and possessed of high insulating capacity. A material which is suitable to employ is one formed of cellulose fibers very loosely integrated together, the material consisting of a multiplicity of gossamer-like layers formed of asphalt impregnated cellulose fibers, the several layers being held together by asphaltic particles, scattered therethrough. This structure is easily compressible. It is fragile and non-self-supporting. This particular material is water resistant in that the cellulose fibers are coated with thin films of asphalt.

As shown in Fig. 2 of the drawing this interior insulation lamination may be made up of two separate layers, 20 and 22, which are separated from each other by a layer 16 of relatively dense material which may be an asphalt impregnated paper felt sheet wherein the fibers are relatively compacted. These layers 20, 22, and 16 are assembled together as shown in Fig. 2 with the loosely integrated cellular insulation laminations 20 and 22 separated by the partition lamination 16 and arranged between the two outer protective laminations 14 and 18.

As shown in Fig. 3 the interior lamination of insulation material 21 is of a single thickness, as compared with the two thicknesses shown in Fig. 2. In Fig. 2 my improved structure is illustrated as secured to a supporting member 10 while in Fig. 3 it is shown as a unit separate from such supporting member. In Fig. 4 a single layer of insulation material 21 is employed which is made up in the form of a pad or cushion as hereinafter described. This pad is secured to the foundation layer 14.

The interior laminations of loosely integrated compressible insulation material 20, 21, and 22, as the case may be, are die cut or otherwise apertured to provide openings within which compressible spacers 28 are freely disposed. These spacer elements are formed of suitable compressible insulation material such as cork, rubber, or the like. The partition layer 16 shown in Fig. 2 is similarly apertured to receive the spacer in the construction of this drawing. These spacers serve to hold the outer protecting laminations 14 and 18 apart and prevent crushing of the fragile interior laminations 20, 21, and 22. These spacers are axially compressible and resilient to maintain the structure at its proper thickness even though it may be temporarily compressed in storage, shipment, or the like. The spacers may be cut out into a tubular shape as shown in Figs. 2 and 3 or in a channel shape as shown in Fig. 5 to receive, within the body of the spacer, a fastener to cooperate with the spacer to maintain the proper thickness of the structure.

The fasteners 24 here shown are of a well known commercial variety but any suitable fasteners may be employed. The fasteners illustrated are provided at one end with a compressible head 26 which is adapted to be held normally expanded by the inherent expansible tendency of the split shank. This head may be compressed to be passed through an opening of less diameter than the diameter of the expanded head so that the head will, when passed through such opening, spread apart as shown in Fig. 3 to hold the several laminations together or to secure the laminated structure to a support. This spring fastener is passed through registering apertures in the outer layers 14 and 18 and through the tubular spacer 28 as shown in Figs. 2 and 3 or the channel spacer shown in Fig. 5. Fig. 3 shows a washer or retaining plate 30 adapted to receive the head of the fastener and to overlie the outer protective layer 18 to reinforce such layer.

The spacer elements preferably have an axial dimension slightly less than the uncompressed thickness of the insulation layer so that when the spring fasteners are passed therethrough the insulation lamination is placed under slight compression. This provides a compact unitary construction. In Fig. 4 spacer elements 29, not of tubular construction and not adapted to receive spring fasteners, are employed. These spacer elements are formed of compressible resilient insulating material. The fasteners are separate from the spacers but are otherwise as hereinabove described. The spacers position the two outer protective layers apart protecting the insulation lamination from destructive and permanent compression which might result from compression sufficient to cause the thermoplastic moisture resistant particles to adhere together or to cause the loosely integrated fibers of the interior insulation lamination to be permanently compacted together.

This construction furthermore differs from that shown in Figs. 2 and 3 in that the interior insulation lamination is here shown as made up in pad-like structure, or the like, enclosed within two protective layers 32 of tough, flexible, extensible moisture resistant fibrous material such as is described in copending application Serial No. 758,420, being a joint application wherein this party is an applicant. A suitable material is marketed under the commercial name of X-crepe and comprises two layers of tough asphalt impregnated double creped paper adhesively secured together by an intervening layer of asphalt. These outer protective layers are moisture resistant and possess thermoplastic characteristics. One layer of stiff, fibrous, material 34, such as cardboard, is arranged within the pad to give it form and shape. The outer protective sheets 32 of the pad may be secured together along the edges of the fluffy wadding layer 21 enclosing the interior wadding-like material. This securement may be thermoplastic adhesion. This pad is then placed upon the foundation layer 14 and may be adhesively secured thereto. The spacers and fasteners serve as heretofore described.

In the assembly of the several laminations the spacers 28 may be assembled on the foundation lamination 14 through the use of the fasteners 24 or as in the case of Fig. 4 they may be adhesively or otherwise secured thereto. The several layers 20, 21, 22, 16, and 18, or such number thereof as is desired, may be then assembled on this foundation lamination as upon a jig, the spacers and fasteners serving to properly position the several laminations on the foundation lamination.

When the required insulation layers and protective layers are assembled and the fasteners are in place, the fasteners exert a slight compressive tendency on the several layers counter the resilient spacer elements holding the several laminations snugly together and providing an integral construction.

The panel in this form may be freely handled, stored, or shipped without danger of the laminations becoming separated or detached from one another and without danger of destructive compression of the insulation lamination. This method of assembly and securement eliminates the necessity of adhesively or otherwise securing the several layers together.

When it is desired to apply this panel to a supporting element such an element is provided with fastener receiving apertures arranged to receive the fasteners which secure the several layers of the panel together. The panel is then juxtaposed thereupon and the heads 26 of the fasteners are urged through the apertures in the supporting wall. Such a wall here shown as 10 is provided with apertures adapted to receive the fasteners and in Fig. 2 my improved panel is shown as supported thereupon. To attach this panel to such a supporting structure the interior laminations are further compressed to permit the reception of the thickness of the supporting wall upon the fasteners as shown in Fig. 2. This compression is resisted by the interior layers and particularly by the spacer elements 28 so that when the panel is secured to this supporting wall it is snugly held in place thereon by the inherent expansible tendency of the spacers and interior laminations. It may be readily detached therefrom and upon detachment the fasteners serve to hold the several laminations of the panel together.

In each modification the interior compressible layer of insulating material is protected against destructive or permanent compression by the spacer elements. These spacer elements are themselves yieldable to axial compression to permit attachment of the panel to its support and those spacer elements which are employed for the insertion of fasteners therethrough are axially resilient and provided with fastener openings. Spring fasteners may be passed therethrough as shown and upon slight compression of the panel structure these fasteners may then be received through the provided apertures in the support to secure the panel to the support.

What I claim:

1. In combination with a support having a fastener receiving aperture, a laminated panel comprising a loosely integrated compressible insulation lamination arranged between two outer protective laminations, and having a resilient spacer element disposed between the two outer laminations and within the thickness of the interior lamination, and having a thickness less than the uncompressed thickness of the interior lamination, a spring fastener having a shank of a length less than the uncompressed thickness of the interior lamination and extending through said several laminations in the panel and having a head portion at each end, one of said head portions being compressible and expansible holding said two outer laminations against said spacer element and holding the interior lamination under compression, said fastener shank having a length greater than the combined thickness of the support and the permitted compressed thickness of the spacer element permitting the extension of the fastener shank through the support upon compression of the spacer element.

2. A laminated structure comprising a spacer having a fastener receiving aperture, a panel formed of a plurality of laminations one of which is resiliently compressible, a spring fastener having a shank extending through the several laminations of said panel and having a head portion at each end holding said laminations together with the resiliently compressible lamination held under compression, one end of said fastener being receivable through the aperture of the spacer, said resiliently compressible lamination having a permitted compression equal to the thickness of said spacer.

MEREDITH S. RANDALL.